Aug. 22, 1961  D. L. SCHUBERT ET AL  2,997,082
ROTARY CROSSGRAIN WOOD FLAKER
Filed May 1, 1959  3 Sheets-Sheet 1
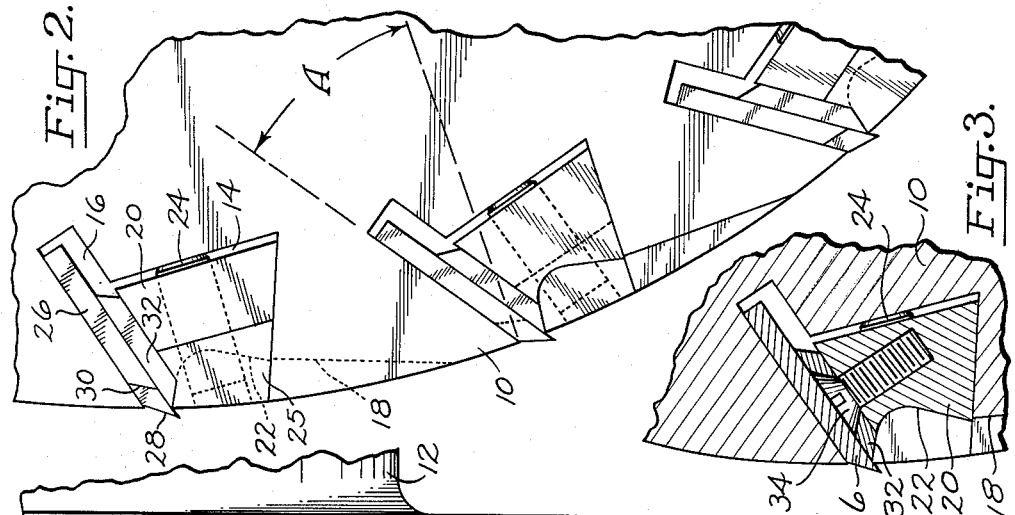
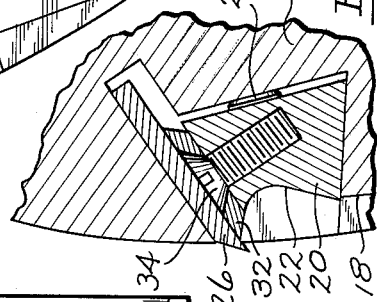
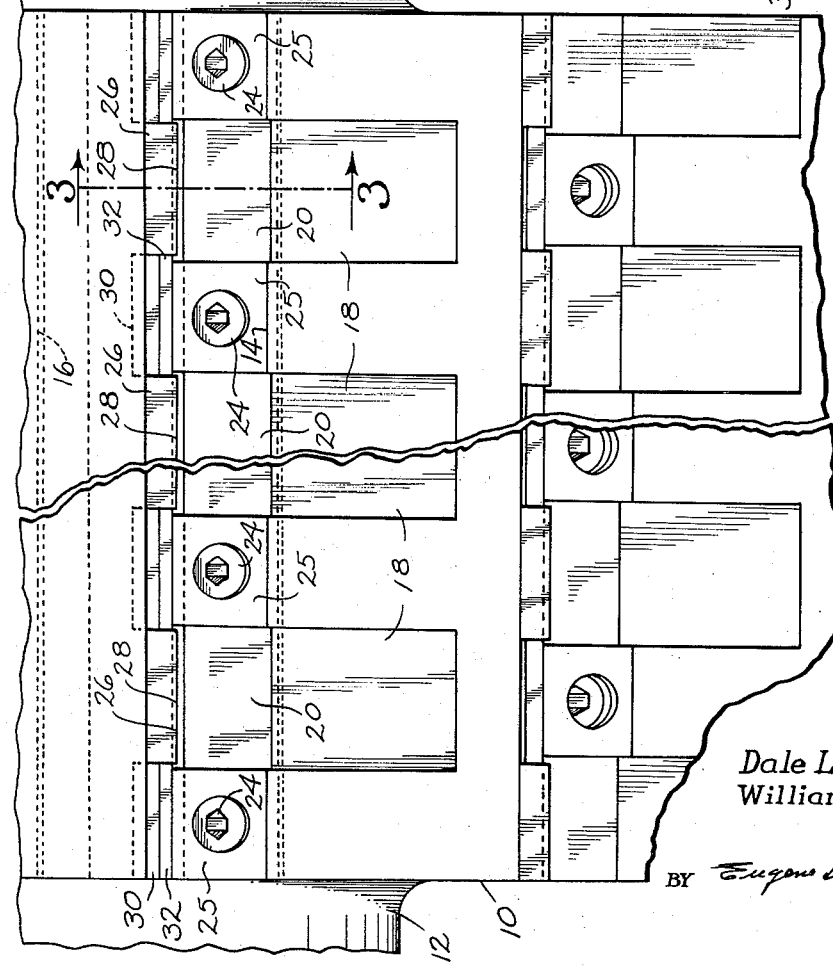
Dale L. Schubert
William C. Connick
INVENTORS
BY Eugene D. Farley
Atty.

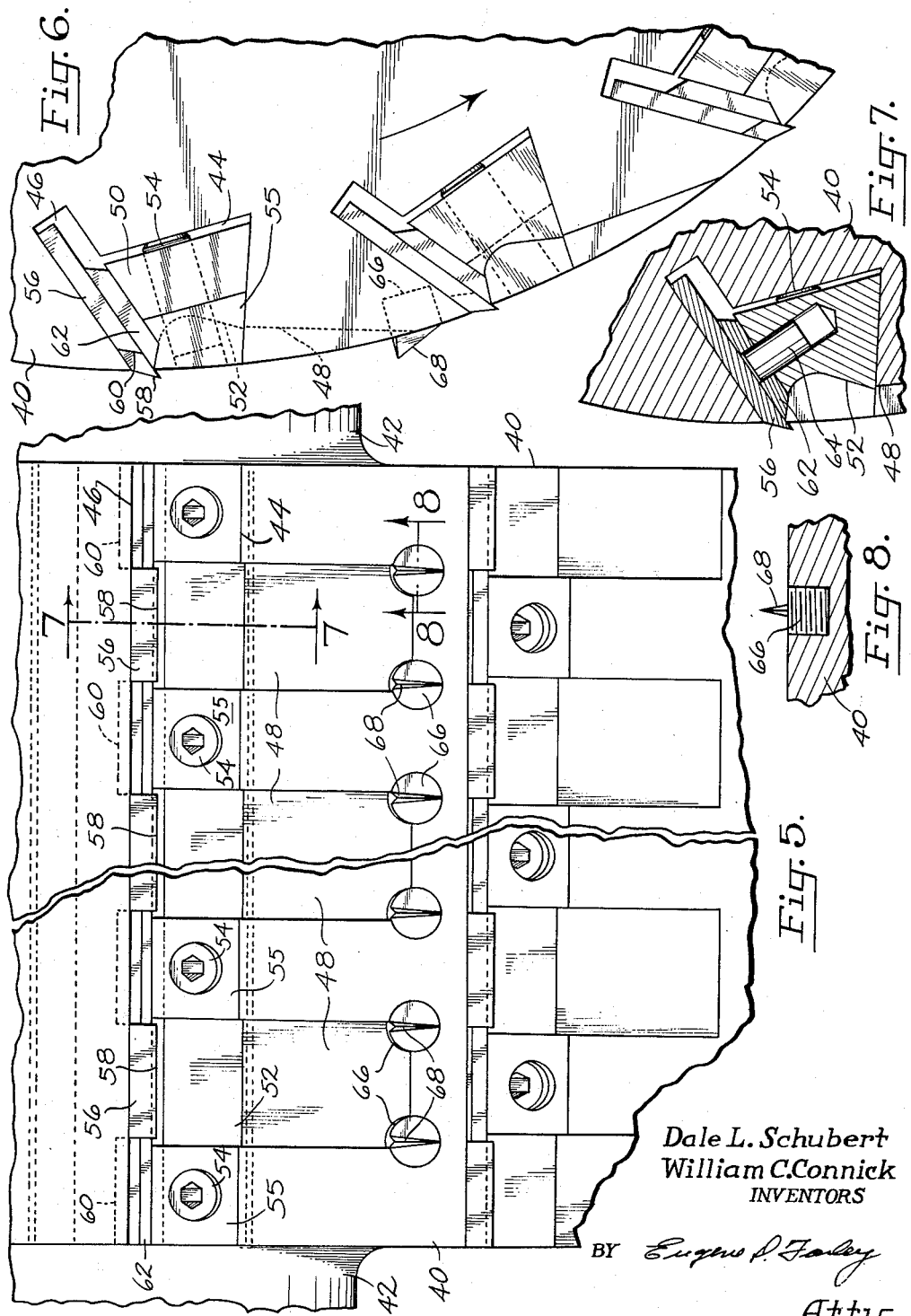

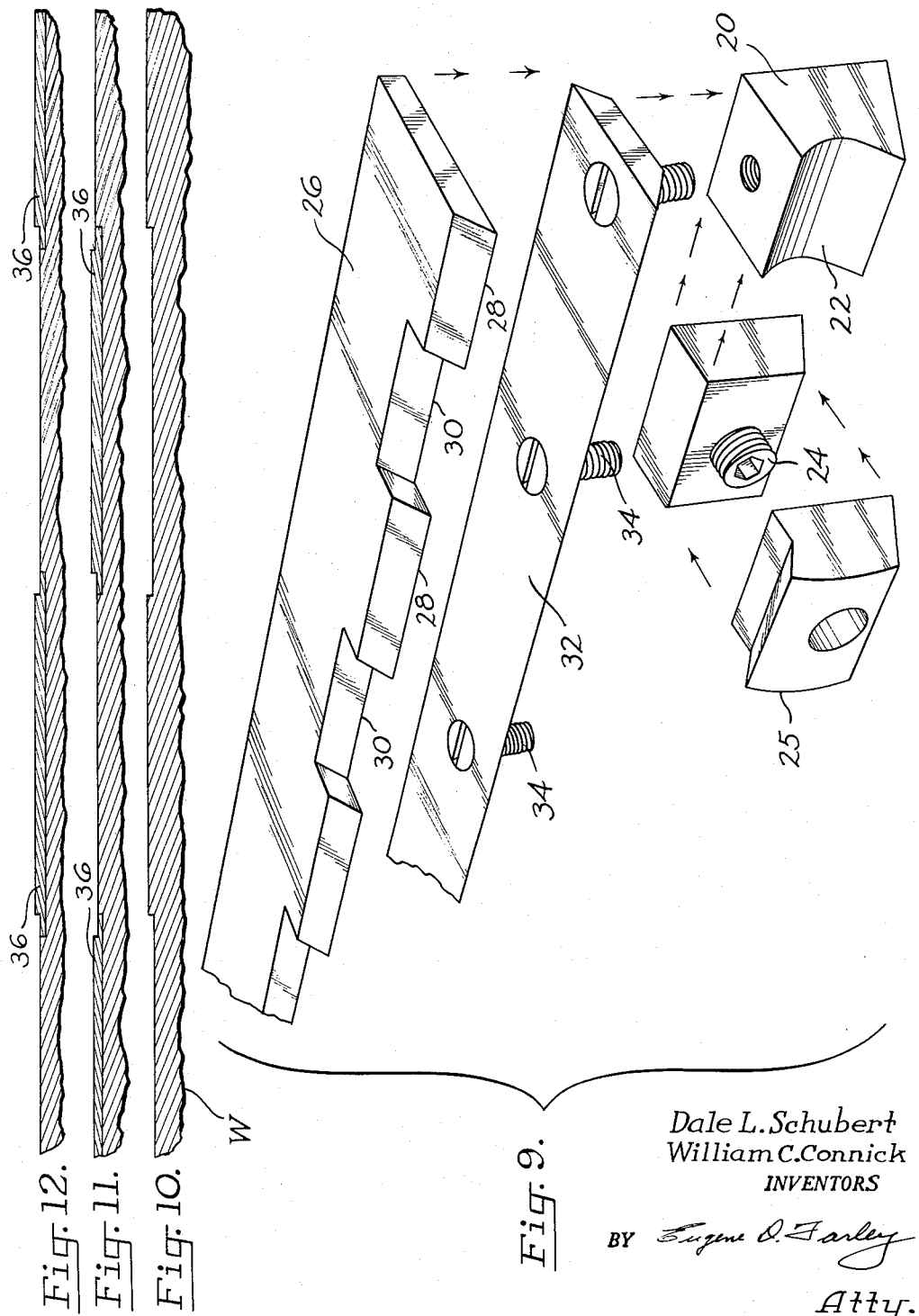

United States Patent Office 2,997,082
Patented Aug. 22, 1961

2,997,082
ROTARY CROSSGRAIN WOOD FLAKER
Dale L. Schubert and William C. Connick, Tacoma, Wash.; said Connick assignor to Industrial Development Co., Inc., Tacoma, Wash., a corporation of Washington
Filed May 1, 1959, Ser. No. 810,335
12 Claims. (Cl. 144—230)

This invention relates to rotary, cross grain wood flakers.

In the manufacture of wood flakeboard, wood logs or billets first are reduced to flakes by cutting them across the grain. The flakes then are mixed with thermosetting resin and size, formed into a felt and consolidated to the desired thickness and density in a hot press.

In the foregoing sequence, it is important to provide wood flakers which operate rapidly, smoothly, and efficiently so as to produce a large volume of flakes at minimum costs and a maximum production rate. In addition, it is essential that the flakes produced be of substantially uniform thickness, have sharply defined side edges, and be free from sticks and slivers. Any substantial irregularity in flake dimensions obviously will be reflected in a corresponding irregularity in the properties of the finished board.

Accordingly it is the general object of the present inventon to provide a rotary, crossgrain, wood flaker which will produce uniform flakes at a high production rate, even when the wood being processed is frangible and easily broken, as in the case of cedar.

It is another important object of the present invention to provide a flaker of the indicated class which is capable of precision cutting over long operating periods, but which is easily disassembled and assembled when such is necessary for servicing and knife sharpening.

In the drawings:

FIGS. 1 and 2 are fragmentary plan and end elevation views, respectively, of the rotary crossgrain wood flaker of the present invention;

FIG. 3 is a fragmentary detail sectional view taken along line 3—3 of FIG. 1 and illustrating the construction of a cutting unit of the flaker;

FIG. 4 is a perspective view illustrating the shape of a flake produced by the flaker of FIGS. 1–3;

FIGS. 5, 6 and 7 are fragmentary plan, end elevation, and sectional views, similar to FIGS. 1, 2 and 3, but illustrating the herein described flaker in another of its embodiments, FIG. 7 being taken along line 7—7 of FIG. 5;

FIG. 8 is a fragmentary detail view taken along line 8—8 of FIG. 5 and illustrating a scoring point employed in the presently described flaking assembly;

FIG. 9 is an exploded view of the cutting unit of the FIG. 1 embodiment; and

FIGS. 10, 11, and 12 are fragmentary sectional views of a workpiece showing steps in the removal of flakes therefrom.

Generally stated, the flaker of our invention comprises a cylindrical rotor having in its peripheral surface a plurality of spaced, parallel longitudinal intercommunicating gibways and knifeways. A plurality of gib-knife assemblies are seated one in each of the gib- and knife-ways. Each of these assemblies comprises a gib provided with spaced, transverse gullet sections; a knife having projecting cutting sections alternating with recessed non-cutting sections, the former being aligned with the gullet sections of the gib; and a flake deflector interposed between the knife and the gib.

Considering the foregoing in greater detail and with particular reference to the drawings:

FIGS. 1–4

In the embodiment of FIGS. 1–4 the flaker comprises a forged steel, cylindrical rotor 10 which may be, for example, two or three feet long and from eighteen to thirty-six inches in diameter. It is formed with integral shafts 12 adapted to be journaled in suitable bearings and power driven in the manner conventional with flakers of this class.

The rotor is formed with a number of spaced, parallel, longitudinally extending gibways 14 extending the full length of the rotor which have the wedge shape evident particularly in FIG. 2. Each of the gibways communicates with a knifeway 16 also extending the full length of the rotor.

Circumferential gullet sections 18 are milled out of the rotor at spaced intervals, each communicating with a gibway. A gib 20 extending the full length of the rotor, but which may be formed in several longitudinal sections for ease of handling has a wedged-shaped contour conforming to that of the gibway and is seated in the latter. It is milled to provide gullets 22 which register with gullet sections 18 in the periphery of the rotor. Also, it is drilled and tapped at intervals alternating with the gullets to provide openings into which Allen head screws 24 or other securing means may be threaded. Insert blocks 25, disposed in the gibways 14 at spaced points, are apertured to receive the screws 24 and are wedged, together with gibs 20, into a fixed position by the screws which bear against the bottom of the gibways.

Knives 26 are seated in the knifeways. As in the case of the gibs, each knife extends the length of the rotor but may be made up of a number of longitudinal segments for ease of handling. Each knife comprises a bar, the working edge of which is divided into sharpened working sections 28 and non-sharpened recessed sections 30. In the embodiment of FIGS. 1–4, the former sections are somewhat longer than the latter, illustrative lengths being for example, 1⅛ inch and ⅞ inch, respectively.

The angle at which the knives are positioned in the rotor is critical in determining their cutting efficiency. This angle can determine the difference between successs and failure in flaking wood such as cedar, the flakes of which crumble and disintegrate very readily. Accordingly we maintain the angle of the knife with respect to the radius of the rotor, i.e. angle A of FIG. 2, at a value of from 30–40°, preferably from 33–37°. When this limitation is observed, the flaker may be employed with the greatest success in flaking woods which otherwise are flaked with difficulty.

Interposed between gib 20 and knife 26 is a bar 32 which we denominate a "flake deflector." Its function is that of deflecting the crosscut flakes as they are formed and guiding them through the gib-knife units to the discharge side thereof. The position of the working or outer surface of the flake deflector with respect to the cutting edge of the knife and the gullets of the gib is critical in determining the length of flakes which are produced by the flaker. Hence it is of the greatest importance to provide a member which is of such a character that the desired relationship may be maintained over long operating periods and which will not come out of adjustment or wear away after a short operating interval.

Accordingly we have provided the bar 32. This bar extends the length of the rotor and in section has the configuration of an isosceles trapezoid, as is particularly apparent in FIGS. 2 and 3. Since it is symmetrical, it is reversible and both of its side edges are available for use.

Suitable means are employed for locating and positioning the flake deflector with its working edge surface guiding the flake down into the gullet of the gib. Such means may comprise flat headed screws 34 threaded through the flake deflector into the gib at suitable intervals.

In assembling the rotor, flake deflections 32 first are fastened to gibs 20 by means of screws 34. The resulting assemblies, together with knives 26 which they back up, then are slid endwise into the gibways and knifeways 16 respectively. It will be noted from FIG. 1 that the arrangement between successive cutting units is such that the cutting sections 28 of the knives are staggered, each overlapping the knives in the adjacent row by a small amount. Screws 24 which bear against the bottom of the gibways, then are tightened down on insert blocks with the result that the gibs wedge upwardly, securing the knives in the desired adjustment position.

Logs or blocks of wood on a suitable bedplate then may be fed crossgrain to the rotor with the result that each knife peels off a ribbon of wood, the leading edge of which passes over the working surface of flake deflector 32, down into gullet 22 of gib 20 and then into registering gullet section 18 of the rotor. Thereafter, it is discharged from the rotor.

The adjustment of the knives is such that, in view of their overlapping arrangement, a flake 36 having the general stepped contour of FIG. 4 is produced. Thus the depth of cut is adjusted so that a leading knife cuts a swath through the end margin of the flake which is to be severed by a trailing knife. As a result, the flakes have uniform ribbon edges.

FIGS. 10, 11 and 12 illustrate the cutting action of the knives in the formation of the stepped flakes 36. More particularly, FIG. 10 shows grooves in a workpiece W upon initial engagement by a leading knife. FIGS. 11 and 12 illustrate the overlapped path of leading and trailing knives whereby a leading knife cuts a groove from the workpiece in an area over lateral side edges of flakes to be severed by the trailing knife and thus forming thinned lateral edges on the flakes.

FIGS. 5–8

In the form of the invention illustrated in FIGS. 5–8, scoring means are provided for insuring that the side edges of the flakes are cleanly formed.

The general construction of the rotor assembly is closely analogous to that described above. It comprises a rotor 40 of forged steel provided with shafts 42. Wedge shaped gibways 44 extend longitudinally across the surface of the rotor and communicate with parallel knifeways 46. Spaced, circumferential gullet sections 48 are milled in the surface of the rotor and these, too, open out into the gibways, but on the sides opposite the knifeways.

Wedge-shaped gibs 50 are seated in the gibways and each of these is formed with a gullet section 52 which registers with the corresponding gullet section 48 in the rotor. The gibs are drilled and tapped at intervals to accommodate set screws 54 which penetrate suitably dimensioned insert blocks 55.

Knives 56 are received in knifeways 46. Like knives 26, they have alternating cutting and recessed sections 58, 60, respectively. These sections are distinctive, however, in that they are of equal length so that there is no overlapping of successive knife blades as in the case of the preceding embodiment.

Flake deflectors 62 corresponding to flake deflectors 32, are inserted between the gibs and the knives. They may be secured to the gibs by means of screws, but in the illustrated form of the invention are thus secured by means of roll pins 64.

In addition to the foregoing elements, the assembly includes scoring elements each comprising a threaded base 66 from which extends a scoring point 68 having the configuration of a narrow, unsymmetrical pyramid. The scoring elements are screwed into the rotor at locations aligned with the edges of each of the cutting sections of the knives, with their elevated portions trailing.

The assembly and operation of the flaker of FIGS. 5–8 is similar to that previously described with the exception that scoring points 68 continuously cut the wood across the grain and thus sharply define the areas scooped out by the knives. Because of their particular form, the scoring points have a rudder-like action and remain at all times parallel to their direction of motion. As a result, they remain firmly seated in the rotor.

It is to be understood that the forms of our invention herein shown and described are to be taken as preferred examples of the same and that various other changes in the shape, size and arrangement of parts may be resorted to without departing from the spirit of our invention or the scope of the subjoined claims.

Having thus described our invention, we claim:

1. A rotary, cross-grain wood flaker comprising a cylindrical rotor having in its peripheral surface a plurality of spaced, parallel, longitudinally-arranged, intercommunicating rows of gibways and knifeways; a plurality of gib-knife assemblies seated one in each pair of gibways and knifeways and each comprising a gib provided with a plurality of spaced, transverse gullet sections and a knife having a plurality of projecting cutting sections disposed in a common plane longitudinally of the rotor and having intermediate recessed, non-cutting sections, the cutting sections being aligned with the gullet sections of the gibs and being circumferentially aligned with non-cutting sections in adjacent rows; flake deflectors interposed between the knives and the gibs directing cuts flakes into the gullet sections; and means for securing the gibs, knives and flake deflectors in the gibways and knifeways.

2. The flaker of claim 1 wherein the cutting sections of the knives are wider than the recessed non-cutting sections in adjacent rows, whereby to groove material being cut in an area over a lateral side edge of flakes to be severed by the following knife to sever the flakes cleanly from the wood.

3. The flaker of claim 1 wherein the rotor is provided with spaced, circumferential gullet sections communicating with the gullet sections of the gibways to extend the effective length of the latter gullet sections.

4. The flaker of claim 1 wherein each flake deflector comprises a bar having a slanting outer edge surface substantially conforming to the gullet contour.

5. The flaker of claim 4 wherein the sectional contour of the bar is substantially that of an isosceles trapezoid and the bar is reversably positionable between the knife and gib.

6. The flaker of claim 1 wherein fastening means are provided for securing the flake deflectors to the gibs and for wedging the resulting assemblies in the gibways against the knives in the knifeways.

7. The flaker of claim 6 wherein the flake deflectors are screwed to the side edges of the gibs.

8. The flaker of claim 6 wherein the gibs and gibways comprise cooperating wedge formations and the fastening means comprise screw means threaded into the gibs and bearing against the gibways.

9. The flaker of claim 1 wherein the angle of the knife side surface to the radius of the rotor preferably is from 33–37°.

10. The flaker of claim 1 wherein scoring means are provided in the surface of the rotor at spaced locations opposite the ends of the knife cutting sections for penetrating the work and thereby determining the width of and assisting the knife in severing lateral edges of the flakes.

11. The flaker of claim 10 wherein the scoring means comprise sharp projections threaded into the rotor periphery.

12. The flaker of claim 11 wherein the projections have an unsymmetrical, pyramidal configuration and are arranged parallel to the direction of rotor rotation with the pyramid apex trailing, thereby securing a rudder-like action and preventing the points from working loose from the rotor.

References Cited in the file of this patent

UNITED STATES PATENTS

| | | |
|---|---|---|
| 332,797 | Hagerty | Dec. 22, 1885 |
| 2,739,627 | Vohringer | Mar. 27, 1956 |
| 2,822,839 | Frodermann | Feb. 11, 1958 |
| 2,836,206 | Gaskell | May 27, 1958 |

FOREIGN PATENTS

| | | |
|---|---|---|
| 1,042,167 | France | June 3, 1953 |